United States Patent
Pitchford

[15] 3,698,799
[45] Oct. 17, 1972

[54] CROSS CYLINDER FLIP MECHANISM

[72] Inventor: Richard L. Pitchford, Brockport, N.Y.

[73] Assignee: Bausch & Lomb Incorporated, Rochester, N.Y.

[22] Filed: July 22, 1971

[21] Appl. No.: 165,218

[52] U.S. Cl.................................351/28, 351/29
[51] Int. Cl.........................A61b 3/02, A61b 3/08
[58] Field of Search..............................351/28, 29

[56] References Cited

UNITED STATES PATENTS 3,498,699   3/1970   Wilkinson..................351/29

*Primary Examiner*—David Schonberg
*Assistant Examiner*—Paul A. Sacher
*Attorney*—Frank C. Parker et al.

[57] ABSTRACT

In an ophthalmic refractor improved cross cylinder flip mechanism comprises a cross cylinder lens rotatably mounted in a loupe by means including a pinion meshed with a face gear, the latter being rotatable to achieve a flip, rotation of the face gear being actuated from a handgrip located adjacent the cylinder lens axis control knob, thereby minimizing the attention which a practitioner must give to frequent shifts of his hand from one such handgrip to the other.

11 Claims, 1 Drawing Figure

PATENTED OCT 17 1972
3,698,799
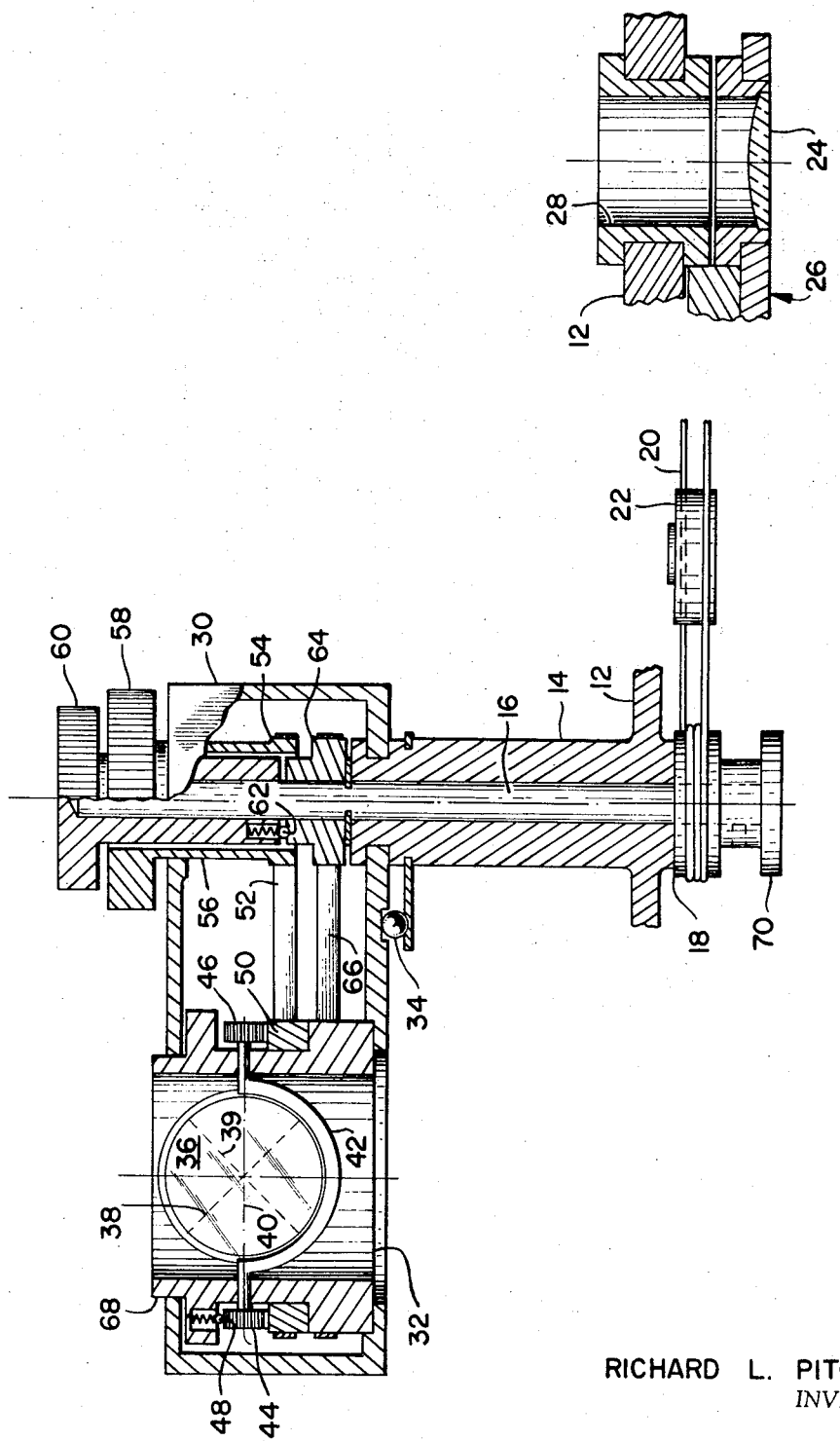
RICHARD L. PITCHFORD
INVENTOR.
BY
JOHN E. LEONARZ
ATTORNEY

CROSS CYLINDER FLIP MECHANISM

BACKGROUND OF THE INVENTION

1. Field of the Invention

The field of my invention is vision testing instruments and, more particularly, improved apparatus for actuating a cross cylinder flip mechanism in an ophthalmic refractor.

2. Description of the Prior Art

A refractor is an instrument used in analyzing a patient's visual defects and in determining suitable optical prescriptions for corrective eyewear. Such corrections may require greater or lesser powers of either or both spherical or cylindrical lenses. Accordingly, refractors commonly feature a plurality of different powered test lenses arranged in carriers, generally disc-shaped and rotatable, and the lenses thereby may be selectively interposed over viewing holes aligned with a patient's eyes until an optimum correction is achieved.

It is desirable that a carrier for cylinder test lenses should have the cylinder axis correctly aligned to the patient's axis of astigmatism and to this end means is commonly provided to cause each of the test cylinder lenses to arrive across the viewing tube with its axis at the same angular orientation as its predecessor.

In performing a refraction involving cylinder lenses, it is often indicated to perform certain additional visual tests, particularly a cross cylinder test. Cross cylinder apparatus is commonly mounted on the exterior of a refractor to be pivoted across the axis of the viewing tube to complement the refraction of a test cylinder lens already present, an important test being performed by flipping a cross cylinder lens, incorporated in the cross cylinder apparatus, about a flip axis. A cross cylinder lens is regarded as having two axes. The first axis is parallel with its cylinder; the second is perpendicular to the first. The flip axis is at 45° to both. The test is performed with the flip axis aligned with the cylinder axis of the test cylinder lens.

Means for automatically maintaining the synchronization of the cross cylinder flip axis with the cylinder axis of the main cylinder lenses, is desirable in such instruments. Existing refractors provide a knob for rotating the lens carrier, and another knob for rotating the cylinder axis, however, the existing provision for actuating the flip mechanism consists of a small knurled wheel or handle attached directly to the cross cylinder lens mount. Motion studies which I have made indicate that a practitioner using a refractor spends a great amount of time moving his hand back and forth between the cylinder lens axis control knob and the flip-actuating handle, much of the time being taken up in orienting his hand to the location of the flip handle. An improved flip-actuating mechanism, therefore, would be one located in a position more convenient to the normal resting place of the practitioner's hand, i.e., the axis control knob. Additionally, such a mechanism should not require the practitioner to orient his hand in order to actuate the flip nor, for that matter, even to require the practitioner's eye to follow his hand movement. I am not aware of any existing refractors featuring such flip-actuating mechanisms.

SUMMARY OF THE INVENTION

In order to provide a remote flip-actuating mechanism I have mounted the cross cylinder lens in an annular or semicircular mount having opposing protrusions connected by a diameter, which is the flip axis, one of the protrusions having a pinion mounted thereon. The other protrusion on the lens mount is cooperative with a detent which seats at the two fully flipped positions of the cross cylinder lens. The pinion is meshed with an annular face gear which is remotely rotatable from a control knob which is coaxial with the cylinder lens axis control knob and shaft.

Accordingly, in operation the practitioner will use the axis control knob to select an axis on a trial basis, and then perform the cross cylinder flip test, interrogating the patient to determine the suitability of the corrections being achieved with each flip. The analysis proceeds on a trial and error basis with several alternations between the axis control knob and the flip actuator knob until eventually an optimum correction is determined. With my invention the practitioner's hand is always immediately in position to actuate either knob without first having to search out the correct orientation. Since many practitioners prefer to observe the patient's face as much as possible during the refraction it is important that the practitioner's instrument leave his eyes as completely undistracted as possible.

In my invention I also employ a wheel detentably connected to the shaft which bears the cylinder lens axis control knob, the wheel being drivably connected to a loupe which mounts the cross cylinder lens, this mechanism serving to synchronize the angular rotations of the flip axis with those of the cylinder lens axis. AXIS.

Since it is further desirable to be able to rotate the cross cylinder lens through an angle of 45° about the axis of the viewing tube, and to make such rotation without disturbing the orientation of the main cylinder lens, further provision is required to permit the loupe to be so rotated. My invention further comprises means by which the loupe may be grasped by the practitioner for the purpose of accomplishing such a rotation. Since the axis of the cylinder lens in the viewing tube must remain still during this rotation I have provided the aforementioned detentable connection between the flip axis synchronizing system and the cylinder lens axis control system. Since the latter has by far the greater friction the detent will slip when a rotational movement is imparted to the loupe, leaving the main cylinder axis undisturbed.

DESCRIPTION OF THE PREFERRED EMBODIMENT

The drawing is a diagrammatic cross section of the cylinder lens control system and the cross cylinder system of my invention.

Only a fragment of the instrument's housing and chassis 12 appears, however it may be observed that a post 14 rises from the chassis to serve as a mount for various apparatus to be explained. Within the post 14 is journaled a cylinder axis control shaft 16 upon which is mounted a wheel 18 having a wire 20 pinned thereto. The wire 20 is tensioned by the idler 22 and is drivably connected to a mechanism for synchronizing the cylinder axes of a plurality of test cylinder lenses 24. Such mechanism, having been well known in the art for many years, and forming no part of the instant invention, is not shown or described in detail herein. The test cylinder lenses 24 are rotatably mounted along the periphery of a carrier disc 26 which is itself rotatable for bringing alternate cylinder lenses 24 into position before a viewing tube 28.

Those skilled in the art will appreciate that a patient whose astigmatism is sought to be analyzed will be positioned relative to the instrument so as to permit one of the patient's eyes to be coaxially aligned with the viewing tube 28. It will be understood that a second carrier disc and viewing tube arrangement is provided for the patient's other eye. In refracting a patient, then, the practitioner will rotate the shaft 16 and the attendant wheel 18 to vary the axes of the lenses 24 until the patient confirms that the axes are substantially correct. The carrier disc 26 is then rotated until a suitably powered lens is interposed before the viewing tube 28, as the patient will further confirm by virtue of the improvement in his vision attributable thereto.

To facilitate the performance of cross cylinder tests, I have provided cross cylinder apparatus in a housing 30, which is pivotally mounted on the post 14. A rotatable loupe 32 is provided within the housing 30, positioned to come into coaxial alignment with the viewing tube 28 when the housing 30 is rotated about the post 14. An adjustable detent 34 is present to assure ready alignment of the loupe 32 with the viewing tube 28, when so rotated. A weak cross cylinder lens 36 is shown rotated 90° between its normal positions so as to present a plan view in the drawing. It may be observed that, as shown in the plan view, the lens' cylinder axes 38 and 39 form an angle of 45° with the flip axis 40. The cylinder lens itself is mounted in a rotatable mount 42 having protrusions 44 and 46 thereon which are coaxial with the flip axis 40. The protrusion 44 takes the form of a cam which is cooperative with the spring-biased detent 48 to afford the practitioner a feel for the fully flipped positions of the cylinder lens 36. As shown, the detent 48 is fully compressed and would not reach its extended position against the cam 44 until the lens 36 and mount 42 were rotated another 90°.

Meanwhile the other protrusion takes the form of a pinion 46. Both protrusions 44 and 46 are formed with round shank portions which are suitably journaled in bearing ports formed in the loupe 32 thereby defining a convenient axis 40 for flip rotation of the lens 36 and mount 42. The pinion 46 is in mesh with a face gear 50 which is freely rotatable relative to the loupe 32. By a "face gear" I mean simply a substantially annular member having teeth along at least one face of the annulus which are cooperative with the teeth of the pinion 46 to induce the pinion's rotation.

The face gear 50 is furnished with teeth along its rim as well as its face and is therefore rotatable in response to movements of the toothed belt 52 with which it is engaged and which is further engaged with a toothed wheel 54. The latter is coupled by means of a hollow transmission tube 56 to a flip actuator knob 58. The toothed belt may be of the kind known as a timing belt. Other direct drive means may be employed to make a driving connection between the wheel 54 and the face gear 50. For example, the belt 52 may be a beaded chain or other chain cooperative with suitable configurations on the face gear 50 and wheel 54. Additionally, the driving connection might take the form of a wire suitably secured to the face gear and wheel, or it might consist simply of a gear train constituted by a plurality of meshed gears.

Thus it may be seen that a rotational movement applied by the practitioner's hand to the actuator knob 58 is transmitted via the tube 56, wheel 54 and belt 52 to the face gear 50, which, engaged with the pinion 46, rotates the pinion and its attendant lens mount 42 and cross cylinder lens 36. The cam 44 and detent 48 serve to enforce complete 180° rotations of the lens 36. It should be observed that the flip actuator knob 58 is immediately proximate and adjacent to the cylinder lens axis control knob 60 which is rigidly connected to the shaft 16 and thence controls the axis selection mechanism previously described. As the practitioner's hand moves from an axis adjustment to a flip movement and back again, as is an extremely common movement during a typical refraction, the knobs 58 and 60 serve as location references for each other due to their proximity and the practitioner never has to divert his eyes from more important phenomenae in order to achieve such transfers of his hand.

Maximum convenience and reliability in the use of a refractor requires that the practitioner not be required to realign the cross cylinder flip axis 40 to the test cylinder lens axis each time a cross cylinder test is to be performed, and therefore mechanism is provided to synchronize the two axes. Connected to the knob 60 is detent 62 which provides a yieldable clutch connection to the toothed wheel 64. The teeth on the wheel 64 are engaged with teeth on a belt 66 which additionally engage teeth formed on the lower periphery of the loupe 32. The loupe 32 provides little resistance to movements transmitted via the detent 62 from the cylinder lens axis control knob 60. The force of the turning loupe 32 is transmitted through the detent 48 to the lens mount 42, pinion 46, face gear 50, belt 52, wheel 54, tube 56 and knob 58 which latter, being without a load, turns freely. The detent 62 may therefore be seen to require means, well known in the art, to provide a sufficiently strong bias, and resistance to slipping, to overcome inertias and residual frictions in the members intervening between it and the knob 58. By careful choice of the transmission ratio provided between the wheel 64 and the loupe 32 to correspond with that between the wheel 18 and its attendant cylinder lenses 24, synchronization is maintained between the flip axis 40 and the test lens axis.

As and when it occasionally becomes necessary to rotate the flip axis 40 independently of the cylinder lens axis, an actuating impulse may be transmitted to the loupe 32 by the practitioner's grasp on a handgrip, such as the exterior knurling 68, on the loupe 32. Such an impulse is simultaneously transmitted through the loupe 32, directly to the belt 66, and indirectly, by the detent 48, mount 42, pinion 46 and face gear 50, to the belt 52. Since the belt 52 is loaded only by the wheel 54 and the unencumbered flip actuator knob 58, these members rotate idly in response to the impulse. The more direct portion of the practitioner's impulse acts through the belt 66 on the wheel 64 and is brought to bear against the detent 62. Since the detent 62 is loaded by the knob 60, the shaft 16 and its attendant test cylinder lens axis adjustment mechanism, the detent 62 yields, leaving the test cylinder lens axis undisturbed while the cross cylinder lens is rotated.

Since in individual instruments the friction inherent in the test cylinder lens axis adjustment mechanism may be inadequate to insure the yielding of the detent 62, a friction disc 70 is provided at the base of the shaft 16 by means of which a suitable amount of friction may be incorporated into the structure.

I claim:

1. In vision analysis apparatus including:

a viewing tube;

means for interchanging a plurality of cylinder lenses across said viewing tube;

means responsive to a control knob for aligning the cylinder axes of said lenses to a predetermined angle across said viewing tube; and cross cylinder means including a cross cylinder lens, a mounting loupe, and means responsive to said control knob for synchronizing the flip axis of said cross cylinder means with said predetermined angle of said cylinder lens axis, improved flipping means for said cross cylinder means including flip actuating means proximate to said cylinder lens axis control knob, comprising:

a. a lens mount for said cross cylinder lens having a protrusion journaled in a wall of said loupe;

b. a pinion affixed to said lens mount;

c. a face gear mounted rotatably relative to said loupe and in meshing contact with said pinion; and d. actuating means proximate said cylinder lens axis control knob and drivably connected to said face gear for rotating said face gear while in mesh with said pinion.

2. The improvement of claim 1 wherein said actuating means comprises a power train, including:

a shaft coaxial with said axis control knob;

a handgrip member affixed to said shaft and proximate said knob;

a first wheel affixed to said shaft; and direct drive means connecting said first wheel with said face gear for flipping said cross cylinder lens.

3. The improvement of claim 2 wherein said direct drive means comprises a chain engaged with protrusions on said first wheel and further engaged with protrusions on said face gear.

4. The improvement of claim 2 wherein said direct drive means comprises a timing belt engaged with protrusions on said first wheel and further engaged with protrusions on said face gear.

5. The improvement of claim 2 wherein said direct drive means comprises wire means connected to said first wheel and further connected to said face gear.

6. The improvement of claim 2, wherein said direct drive means comprises a gear train connected to said first wheel and further connected to said face gear.

7. The improvement of claim 1, wherein said lens mount is connected to said loupe by first detent means defining positions of said cross cylinder lens transverse to said viewing tube.

8. The improvement of claim 2 wherein said lens mount is connected to said loupe by first detent means responsive to positions of said cross cylinder lens transverse to said viewing tube.

9. The improvement of claim 8 wherein said loupe is connected to a second wheel coaxial with said cylinder lens axis control knob by direct drive means, said second wheel being detentably connected by second detent means to said knob for transmitting axis changing movements of said knob synchronously to both said cylinder lenses and to said cross cylinder means.

10. The improvement of claim 9 wherein said loupe further comprises handgrip means adapted for receiving a rotational manipulation transmissable to said loupe, said direct drive means and said second wheel;

said second detent means including means yieldable to such rotational manipulation so transmitted to break and detentable connection of said second detent means, for rotation of said loupe independently of said cylinder lens axis control knob's rotation.

11. In vision analysis apparatus including:

a viewing tube;

means for interchanging a plurality of cylinder lenses across said viewing tube;

means responsive to a control knob for aligning the cylinder axes of said lenses to a predetermined angle across said viewing tube; and cross cylinder means including a cross cylinder lens, a mounting loupe, and means responsive to said control knob for synchronizing the flip axis of said cross cylinder means with said predetermined angle of said cylinder lens axis, improved flipping means for said cross cylinder means, comprising:

a. a lens mount for said cross cylinder lens said mount including means journaled in a wall of said loupe;

b. a pinion coaxial with said flip axis and drivably connected to said lens mount;

c. means for rotating said pinion; and d. actuating means for said pinion rotating means, said actuating means being disposed adjacent said cylinder lens axis control knob.

* * * * *